(12) United States Patent
Douglass

(10) Patent No.: US 9,890,820 B1
(45) Date of Patent: Feb. 13, 2018

(54) ROLLER CLUTCH REVERSING MECHANISM

(71) Applicant: Stuart Douglass, Auburn, CA (US)

(72) Inventor: Stuart Douglass, Auburn, CA (US)

( * ) Notice: Subject to any disclaimer, the term of this patent is extended or adjusted under 35 U.S.C. 154(b) by 113 days.

(21) Appl. No.: 14/563,010

(22) Filed: Dec. 8, 2014

Related U.S. Application Data

(63) Continuation of application No. 13/601,985, filed on Aug. 31, 2012, now Pat. No. 8,904,907.

(51) Int. Cl.
*B25B 13/46* (2006.01)
*F16D 41/08* (2006.01)

(52) U.S. Cl.
CPC .......... *F16D 41/088* (2013.01); *B25B 13/462* (2013.01)

(58) Field of Classification Search
CPC ...... F16D 41/088; B25B 13/462; B25B 13/46
See application file for complete search history.

(56) References Cited

U.S. PATENT DOCUMENTS

| | | | | |
|---|---|---|---|---|
| 3,823,625 A * | 7/1974 | Myers | ................... | B25B 13/466 |
| | | | | 192/44 |
| 4,297,924 A * | 11/1981 | Stephens | ............... | B25B 13/462 |
| | | | | 192/44 |
| 6,082,512 A * | 7/2000 | Marks | ................... | B25B 13/462 |
| | | | | 192/43 |
| 7,213,492 B2 * | 5/2007 | Tsai | ....................... | B25B 13/463 |
| | | | | 81/59.1 |
| 2007/0137440 A1* | 6/2007 | Hwang | ................... | B25B 13/06 |
| | | | | 81/59.1 |
| 2007/0163398 A1* | 7/2007 | Lai Lee | .............. | B25B 23/0035 |
| | | | | 81/59.1 |
| 2007/0245857 A1* | 10/2007 | Phillips | ................. | B25B 13/461 |
| | | | | 81/59.1 |

* cited by examiner

*Primary Examiner* — David B Thomas

(57) ABSTRACT

This application relates generally to a reversible force or torque transfer device. This device may be used in many different applications. The example used for the illustrative purposes of this patent is a wrench. The present invention devises a reverse mechanism that can resist any amount (up to the shear strength of the material) of randomly generated forces that may cause this effect.

8 Claims, 12 Drawing Sheets

ROLLER CLUTCH REVERSING MECHANISM

CROSS REFERENCE TO RELATED APPLICATIONS

This application claims priority to U.S. application Ser. No. 13/601,985, filed Aug. 31, 2012 in the name of inventor Stuart Douglass of Auburn, Calif.

FIELD OF THE INVENTION

This application relates generally to a reversible force or torque transfer device. This device may be used in many different applications. The example used for the illustrative purposes of this patent is a wrench.

BACKGROUND

Extensive prior art exists in the field of indexing wrenches that are used to tighten or loosen fasteners. For the class of wrenches that employ roller clutches to transfer torque from the wrench to the fastener, it is possible that the geometric configuration of the wrench may result in forces that cause the reversing mechanism to be back-driven. If these forces are large enough, the reverse mechanism may enter a neutral position or cause the wrench to change direction.

The present invention devises a reverse mechanism that can resist any amount (up to the shear strength of the material) of randomly generated forces that may cause this effect.

DETAILED DESCRIPTION

Figure 1:
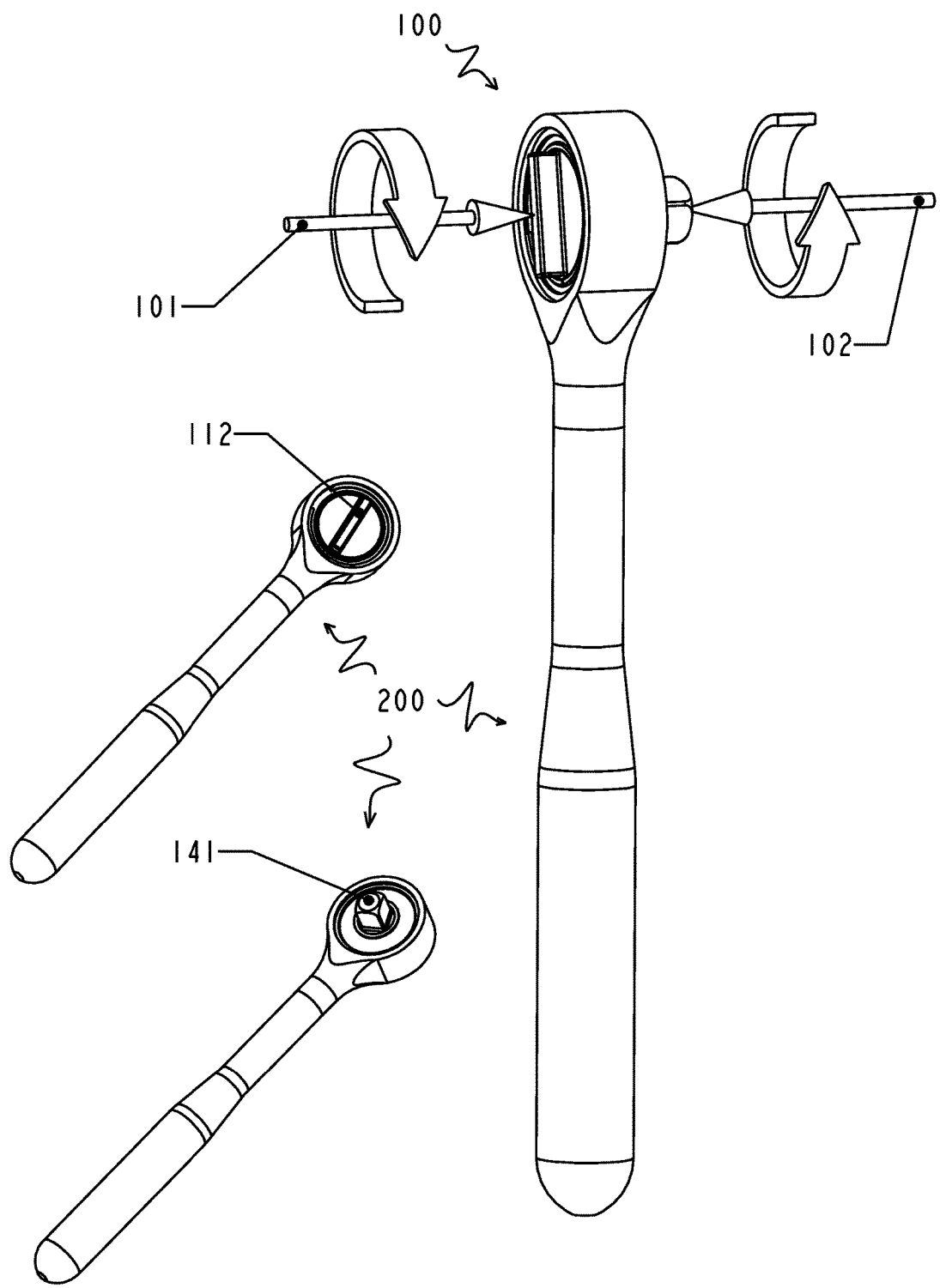
FIG. 1 is a perspective view of a wrench that includes the reverse mechanism device sub-assembly in accordance with the teachings of this disclosure.

Referring to FIG. 1, three perspective views of a wrench 200 that contains the reverse mechanism device 100 are shown. The moment arrows 101 and 102 illustrate the forces that must be applied to the thumb lever 112 and spindle tang 141 when operating the reverse mechanism 100. In this case, applying the moment arrows 101 and 102 place the reverse mechanism 100 in the forward setting. The forward setting results in the wrench transferring torque in the clockwise direction (the wrench 200 is able to tighten a right-hand threaded fastener) when viewed from the back of the wrench (thumb lever 112 faces the user when held in this orientation).

Figure 2:
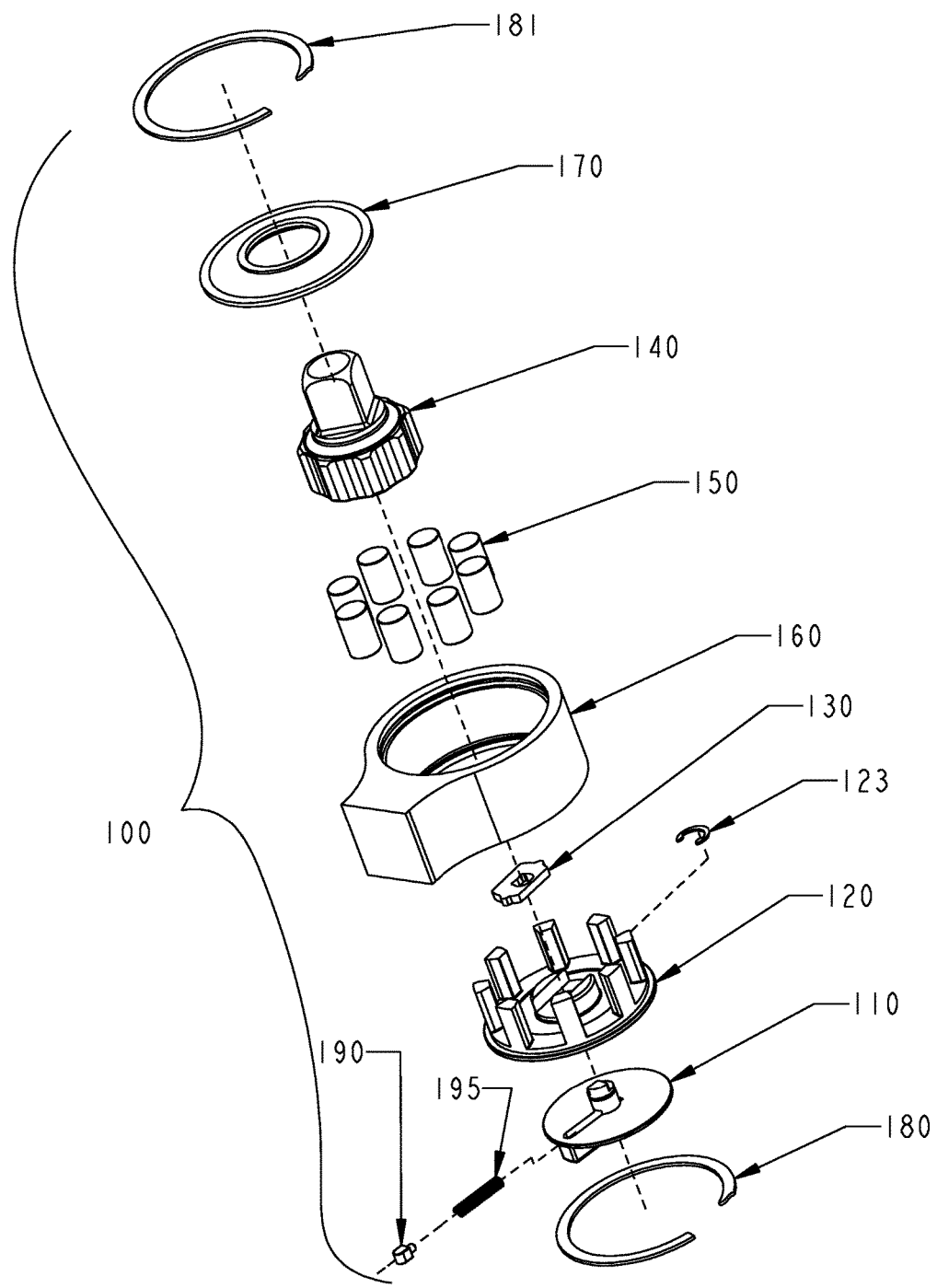
FIG. 2 is an exploded view of the reverse mechanism in accordance with the teachings of this disclosure.

The reverse mechanism 100 is shown in an exploded state in FIG. 2. This figure provides additional perspective on how the parts of reversing mechanism 100 may assemble. For the purpose of this disclosure, FIG. 2 allows the listing of parts with surfaces that develop reactionary forces when reverse mechanism 100 is operated. These are: rigid spindle 140, rigid rollers 150, rigid housing 160, rigid detent slider 130, rigid cage 120, rigid detent hammer 190, and rigid thumb lever 110.

Figure 3:
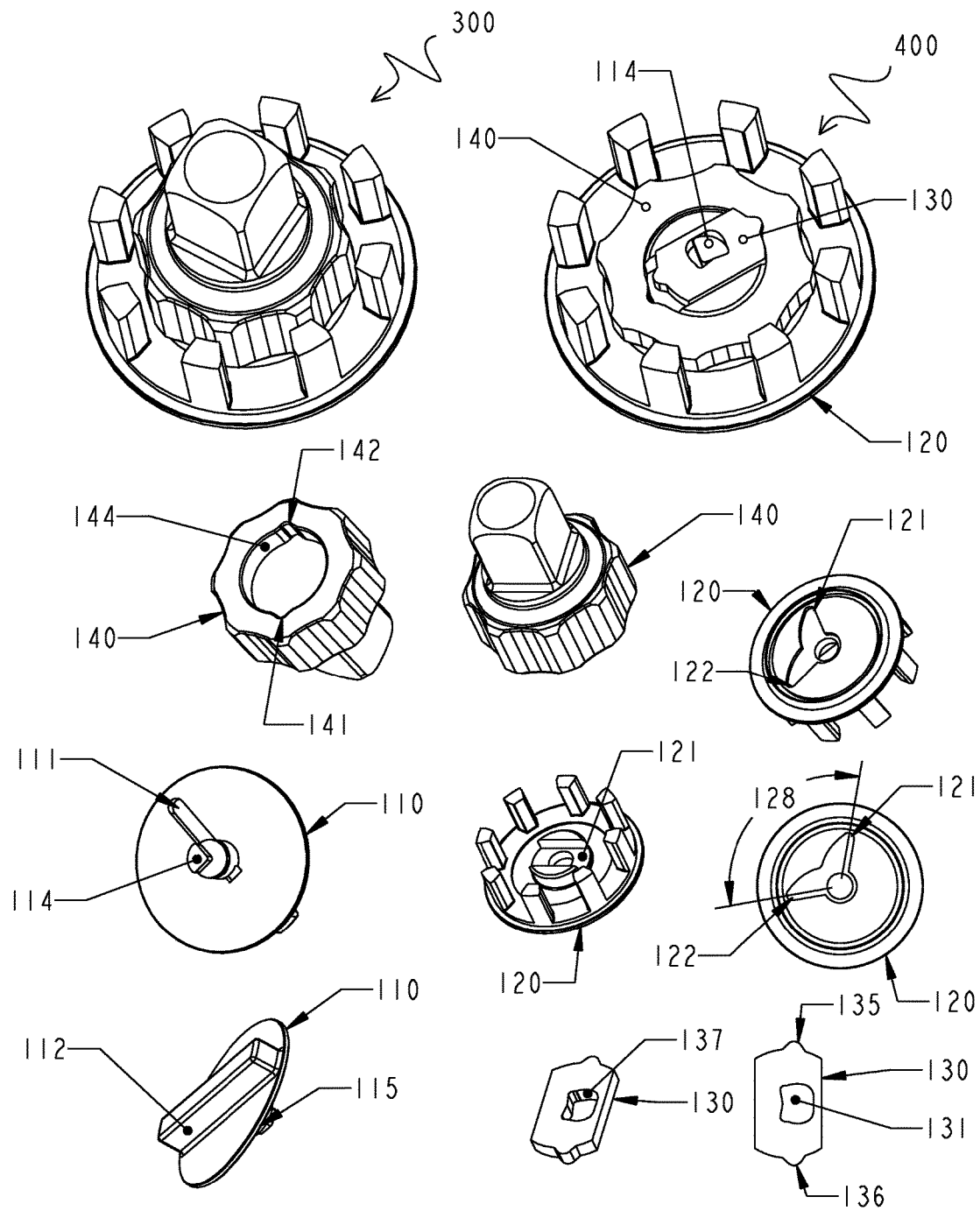
FIG. 3 is a close-up perspective view of the major parts that comprise the reverse mechanism device.
Figure 4:
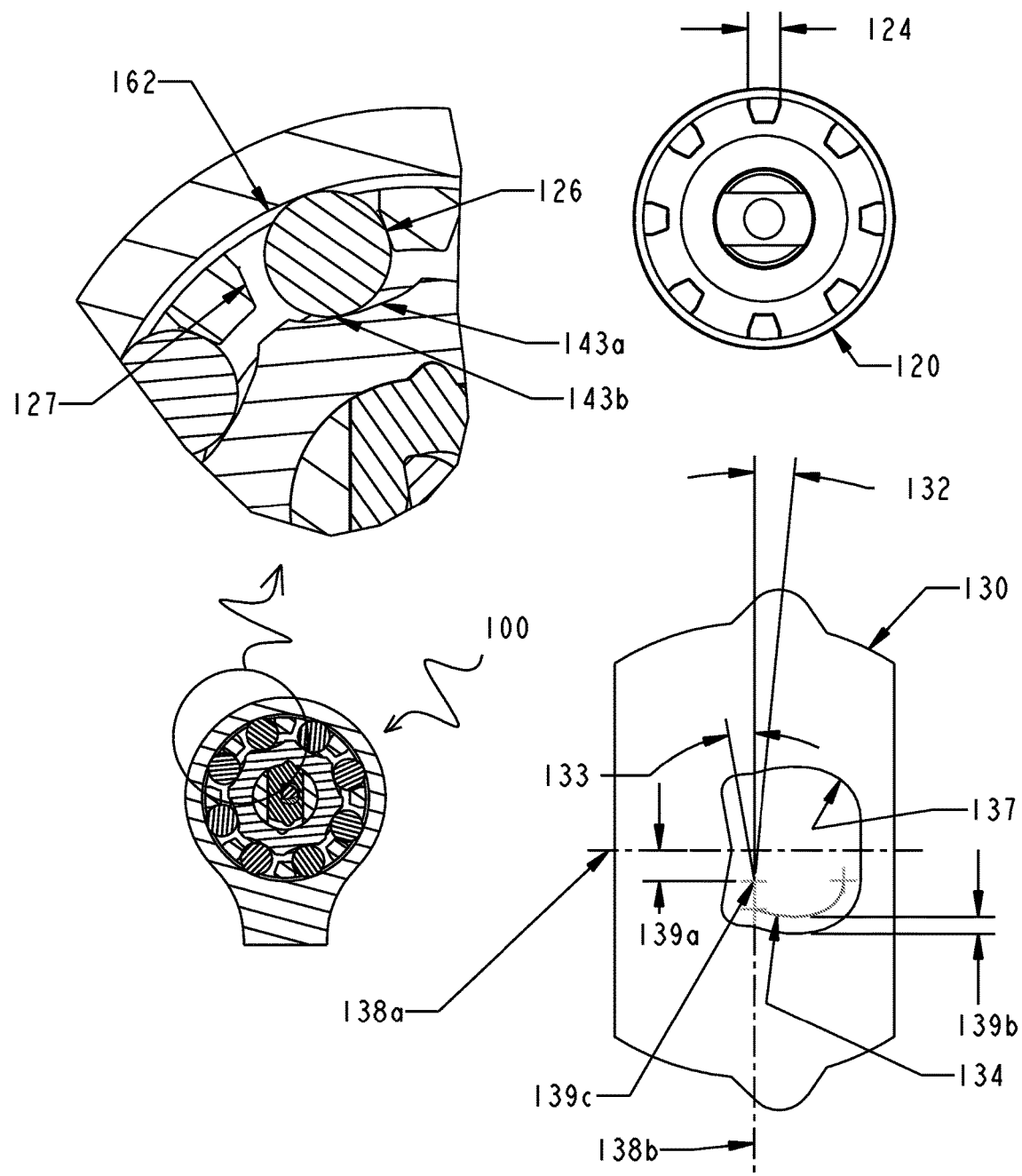
FIG. 4 is a close up view of two of the reverse mechanism's major parts illustrating several important geometric features.

Sub-assembly 300 in FIG. 3 shows several parts of reverse mechanism 100 assembled in a perspective view. Sub-assembly 400 is a sectional view of the same parts. The sectional cut was applied so that the critical part surfaces that develop reactionary forces are visible. In sub-assembly 400 thumb lever 110 has been assembled to the cage 120 and held in place with the retaining clip 123 (clip 123 is hidden behind sliding detent 130). Rigid detent hammer 190 and flexible spring 195 are assembled in detent guide channel 111 and are also hidden by cage 120. Rigid detent slider 130 is inserted into the cage channel 121 such that detent slider hole 131 fits over the rigid triangular boss 114 of rigid thumb lever 110. Spindle 140 slides onto cage 120, with detent grooves 141 or 142 mating with either sliding hammer tooth 135 or 136. The geometry of this preferred embodiment does not require the spindle detent grooves to be mated with a particular detent tooth. This is by design. The detent grooves 141 and 142 are 180 degrees apart. The detent hammer teeth 135 and 136 are symmetrically offset from 180 degrees by the tooth angle 132 (FIG. 4). In a less desirable embodiment, this relationship could be reversed and the detent teeth 135 and 136 could be 180 degrees apart and the detent grooves 141 and 142 could be symmetrically less than 180 degrees apart.

The geometry of the parts comprising device 100 are designed to achieve near tangency of the rollers 150 with three enclosing contact surfaces: pillar surface 126, rigid housing surface 162, and spindle ramp surface 143b (FIG. 4). When the reverse mechanism 100 moves from forward to reverse or the opposite, pillar width 124 and sliding detent tooth angle 132 must be carefully designed to create the near tangent conditions shown in FIG. 4. If pillar width 124 is increased, then tooth angle 132 must decrease. If the pillar width 124 decreases, then tooth angle 132 must increase. If tooth angle 132 increases too much, detent hammer teeth 135 and 136 are difficult to design without interference with the spindle surface 144 and the mechanism fails to work. Also, if pillar width 124 becomes too large, it is possible that it may interfere with roller 150 when large torque is transferred through device 100 and the roller 150 travels high up the ramp 143b.

By design, triangular boss 114 fits smoothly with sliding hammer surface 137 (see, for example, FIGS. 3,4,5,6, and 7a-c). The shape of surface 137 is determined by the equation of line 134. Equation of line 134 in Cartesian coordinates, is:

$$x = r^* \sin(\text{gamma}),$$

$$y=-r*\cos(\text{gamma})+[\text{Total detent slide movement}]/\\(2*\sin((180-\text{beta})/2))*\sin((180-\text{beta})/2-\\\text{gamma}),\quad\text{Equation 1000:}$$

where:

position x=0, y=0 is at the center of the part 130 (intersection of axis 138a and 138b, FIG. 4), r=radius 118–radius 113 (FIG. 5), Total detent slide movement=2*distance 139a (FIG. 4), Beta=angle 119 (FIG. 5), gamma=from 0 degrees through (angle 125 (FIG. 3)–2*(angle 133)(FIG. 4)).

Surface 137 is symmetric about axis 138a and is the preferred shape for hole 131. It provides for smooth motion of the sliding hammer 130 when thumb lever 110 is rotated. The shape of surface 137 also maintains a near tangency with both radiuses 116 and 117 (radii 116 and 117 are equal) with surface 137 simultaneously. The triangular boss angle 119 (FIG. 5) affects the shape of hole 131 by way of equation 1000. The triangular boss corner radius 113 affects the shape of hole 131. Distance 139b (FIG. 4) is equal to radius 113. The distance that sliding detent hammer must slide forward in order to engage a detent groove 141 or 142 (distance 139a, FIG. 4) is also a variable in the equation of line 134. Axis 139c is the location of thumb lever 110 center of rotation relative to sliding detent 130 when detent 135 is fully seated.

Seat angle 133 (FIG. 4) and triangular boss angle 119 (FIG. 5) determine angular distance 128 (FIG. 3), the angular distance between the centers of detent cups 121 and 122. Angle 128 is:

$$\text{Angle128}=\text{angle 119}+2*(\text{seat angle 133}).\quad\text{Equation 2000:}$$

Seat angle 133 affects the shape of hole 131 so that any reactionary forces cannot back-drive the triangular boss 114.

Figure 5:
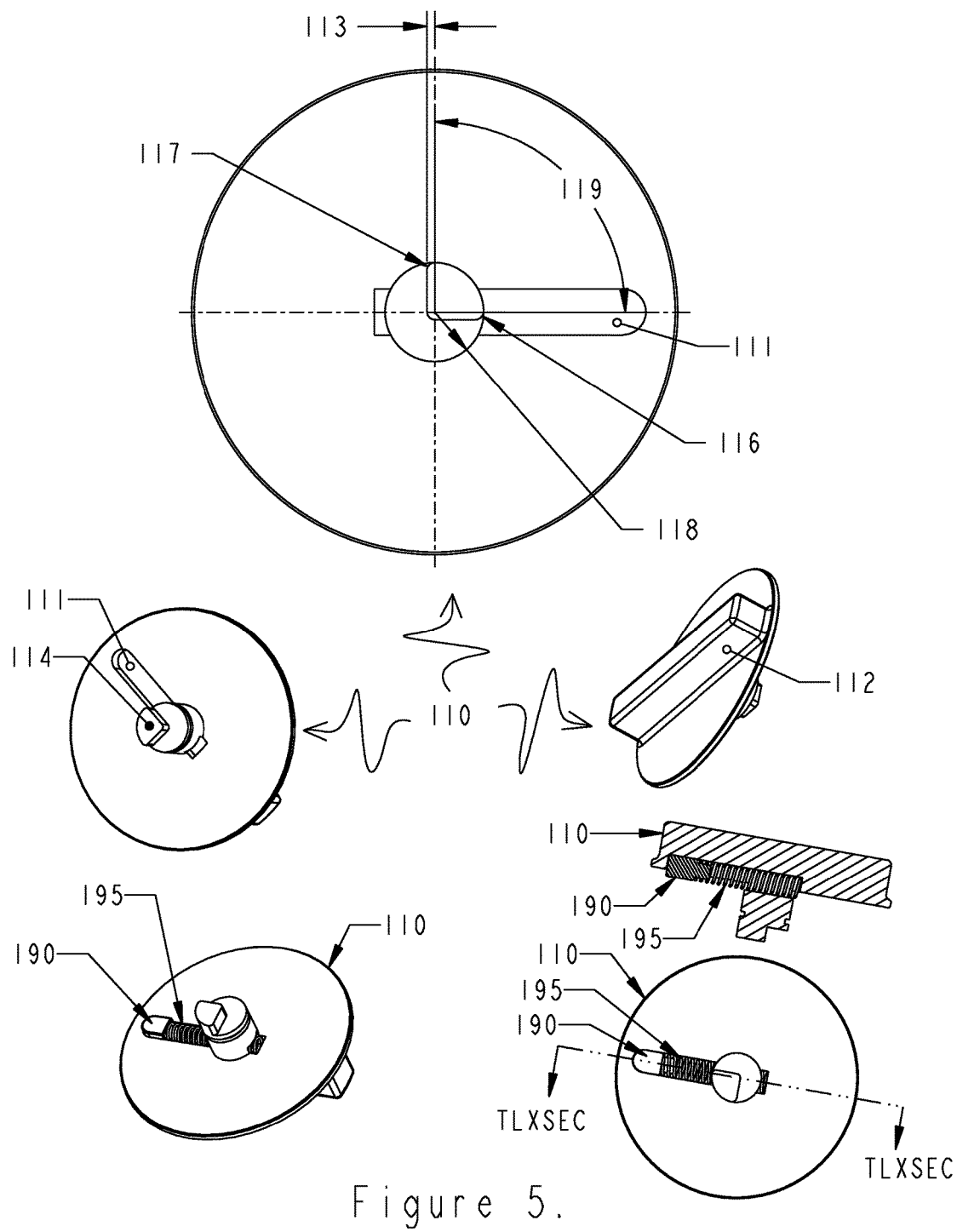
FIG. 5 is a close up view of one of the reverse mechanism's major parts illustrating important geometric features.

FIG. 5, with several perspective views of thumb lever 110, also illustrates in detail the preferred arrangement of the detent hammer 190 and thumb lever 110. The detent hammer channel 111 is aligned with the thumb lever protrusion 112. This allows the thickness 113 of the thumb lever to be relatively small compared to the depth of the detent channel 111. The depth of detent channel 111 is configured so that a portion of the detent hammer 190 will protrude from the channel 111. The height of this protrusion is slightly smaller than the depth of detent guide profile 123. The portion of detent hammer 190 that protrudes from the surface of thumb lever 110 is inserted into the pocket that is formed by detent guide profile 123 (FIG. 3) when the thumb lever 110 is assembled to the cage 120.

Figure 6:
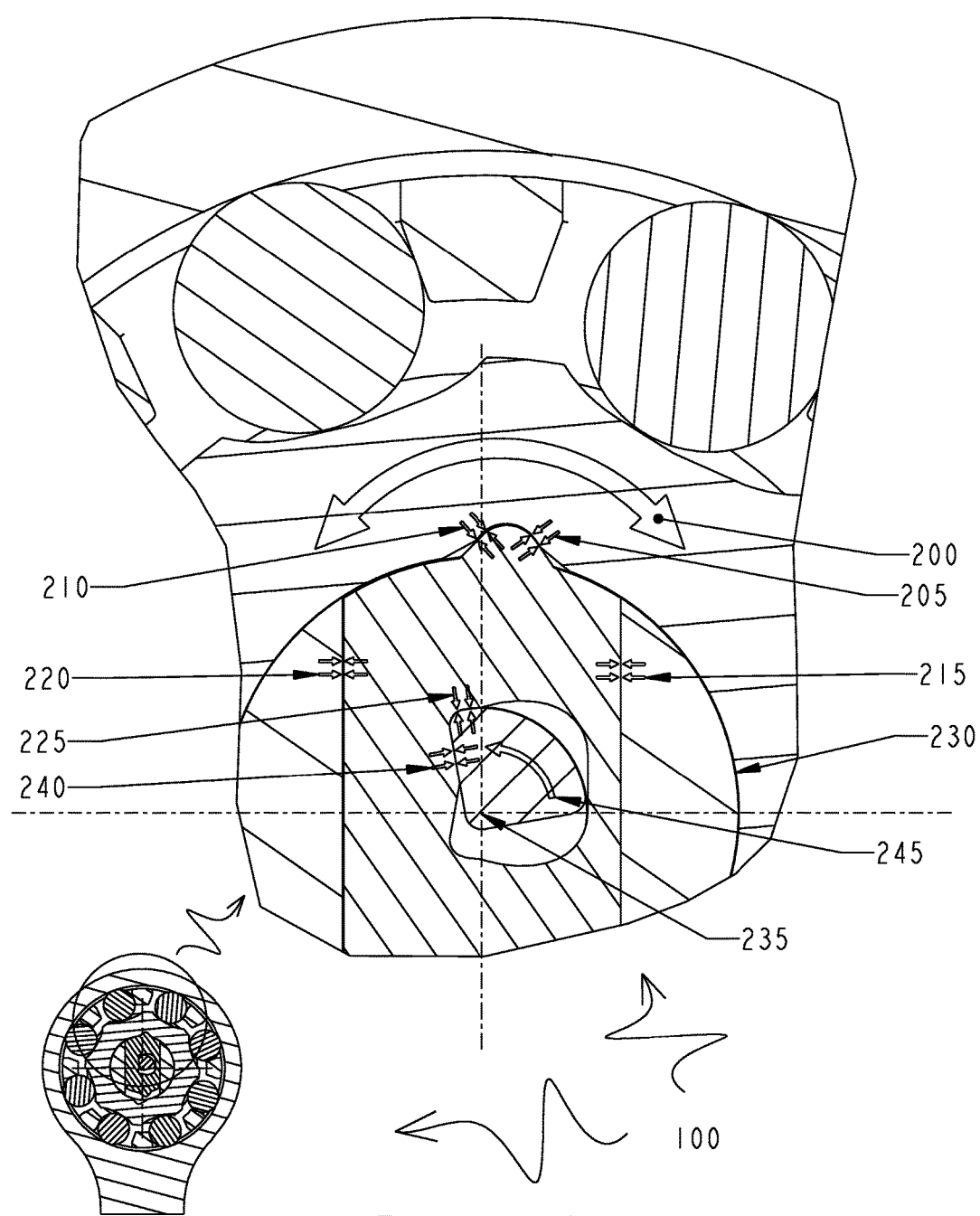
FIG. 6 is a close-up sectional view of the reaction forces present in reverse mechanism in accordance with the teachings of this disclosure.

Referring to FIG. 6, arrow 200 represent a randomly applied moment to spindle 140 relative to the cage part 120. Moments such as moment 200 can develop due to friction between parts and from moments applied perpendicular to the axis of rotation of device 100. If sliding detent 130 and roller bearings 150 were temporarily removed from device 100, spindle 140 could rotate freely about the cage part 120 at surface 230. But, with the sliding detent 130 installed in reverse mechanism 100 and held in place by thumb lever triangular boss 114, spindle 140 cannot rotate freely and any moments that develop result in reactionary forces 205 or 210 depending on the direction of the moment. If triangular boss 114 was temporarily removed from the device 100, reactionary forces 205 or 210 would cause sliding detent 130 to slide in channel 121 such that detent tooth 135 or 136 is pushed away from detent groove 141 or 142. The reactionary forces 215 and 220 keep sliding detent 130 in channel 121.

With the thumb lever triangular boss installed in device 100, and positioned as shown in FIG. 6, sliding detent 130 is not free to push away from the detent grooves 141 or 142 in spindle 140. Reactionary forces 225 develop that prevent such movement of sliding detent 130 due to a moment 200. Furthermore, seat angle 133 positions the reactionary forces 225 such that the net resulting force passes to the left of thumb lever center of rotation 235. This geometry creates a moment 245 and a resulting reactionary force 240. This preferred arrangement results in a mechanism that cannot be back-driven by a moment 200 without shearing triangular boss 114. Seat angle 133 could be zero or negative. If seat angle 133 were a negative value, device 100 would then begin to rely on detent hammer 190 to prevent triangular boss 114 from being back-driven. This is a less desirable configuration. In the preferred arrangement, the detent hammer 190 seated in detent pocket 121 or 122, must only hold thumb lever 110 (and its triangular boss 114) in place until an operator applies moments 101 and 102.

Figure 7A:
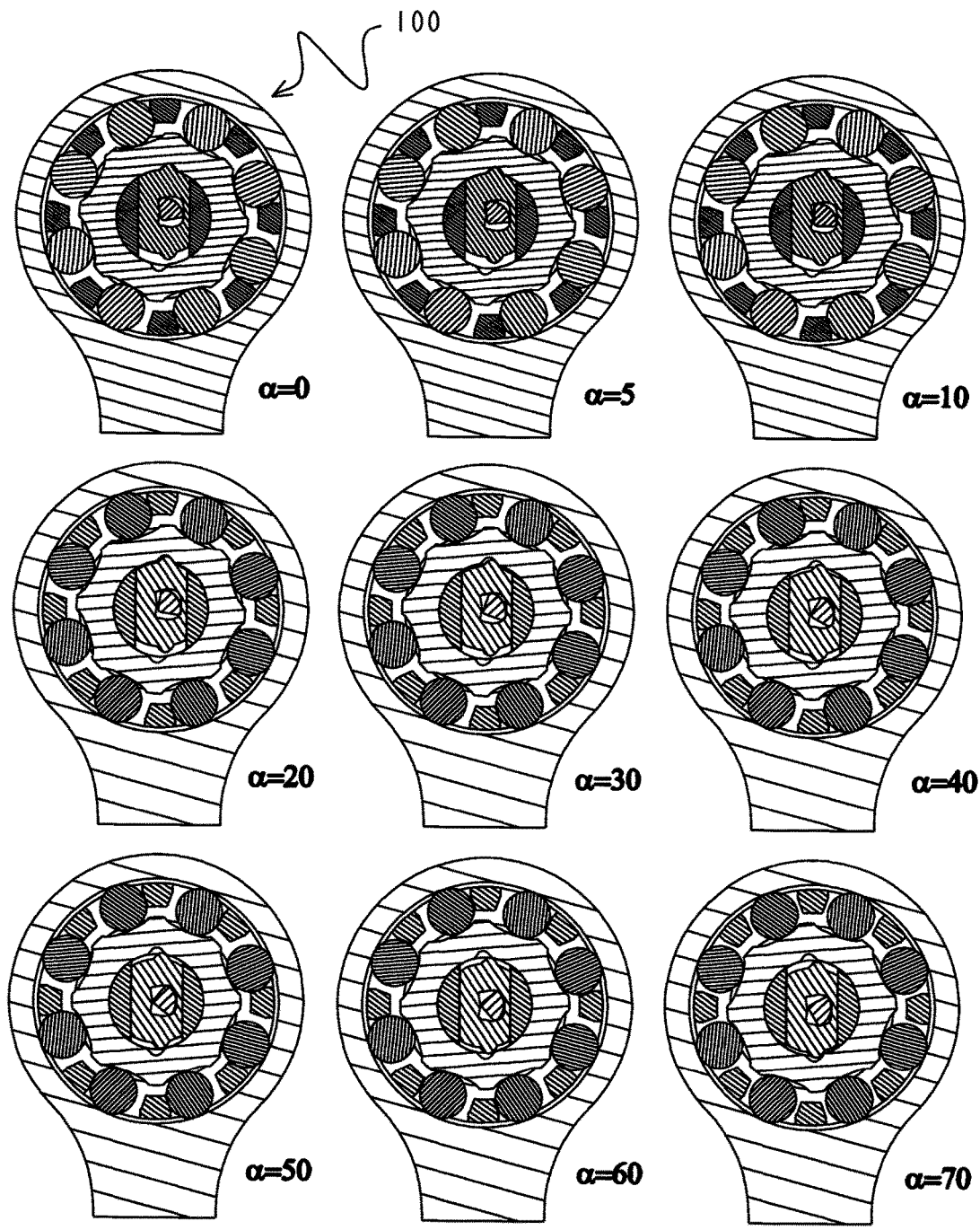
FIGS. 7a, 7b, and 7c is a series of sectional views of the reverse as it moves from a forward (clockwise) to a reverse setting and then back to the forward setting, in accordance with the teachings of this disclosure.

FIGS. 7a,b, and c are a series of cross-sectional views that illustrate the operation of reverse mechanism 100 when moments 101 and 102 are applied. The figures show device 100 going from a forward configuration (able to tighten a standard right-hand threaded fastener) to a reverse configuration (able to loosen a standard right-hand threaded fastener) at alpha=110 and then back to a forward configuration (alpha=110 through alpha=0').

Figure 7B:
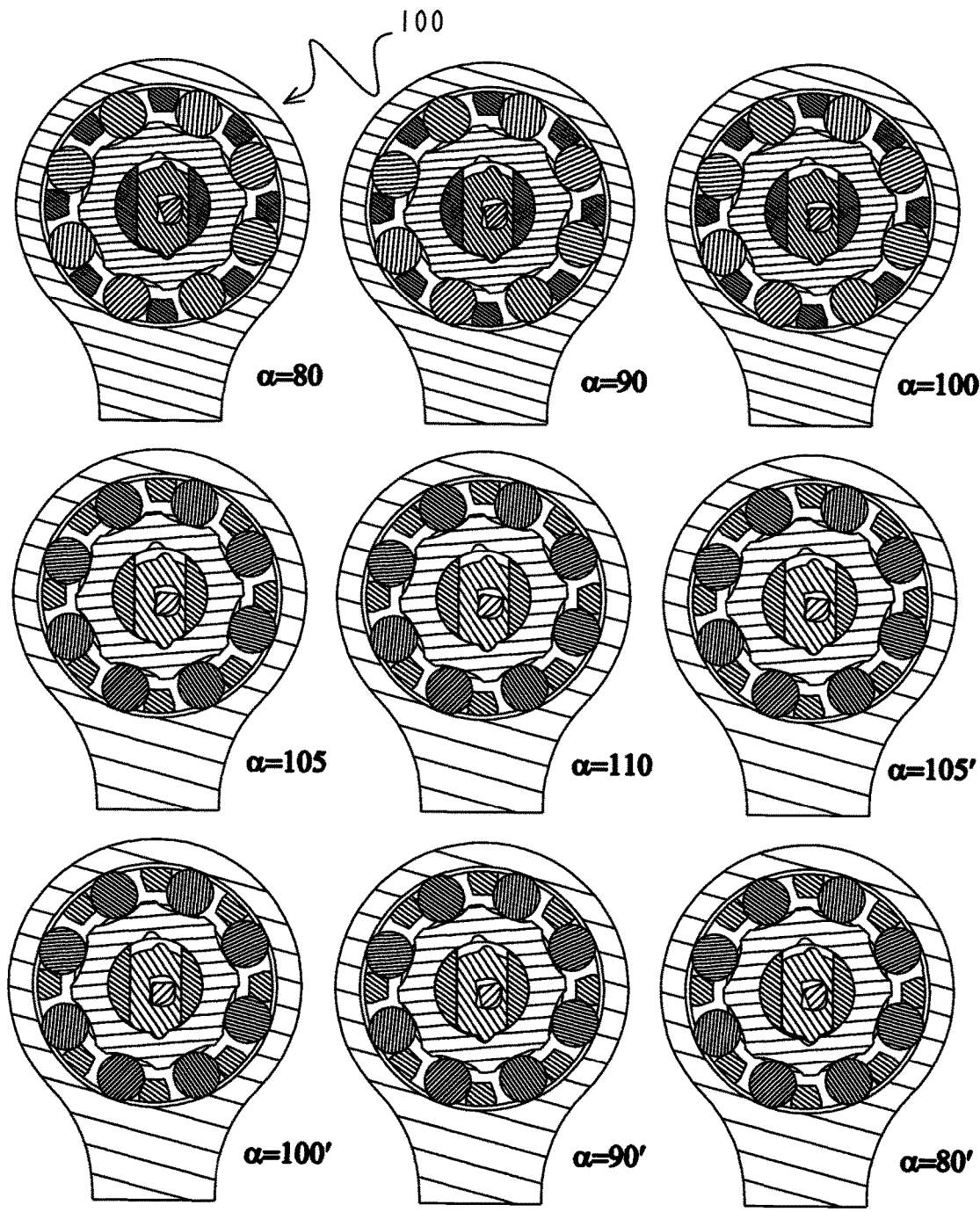
Figure 7C:
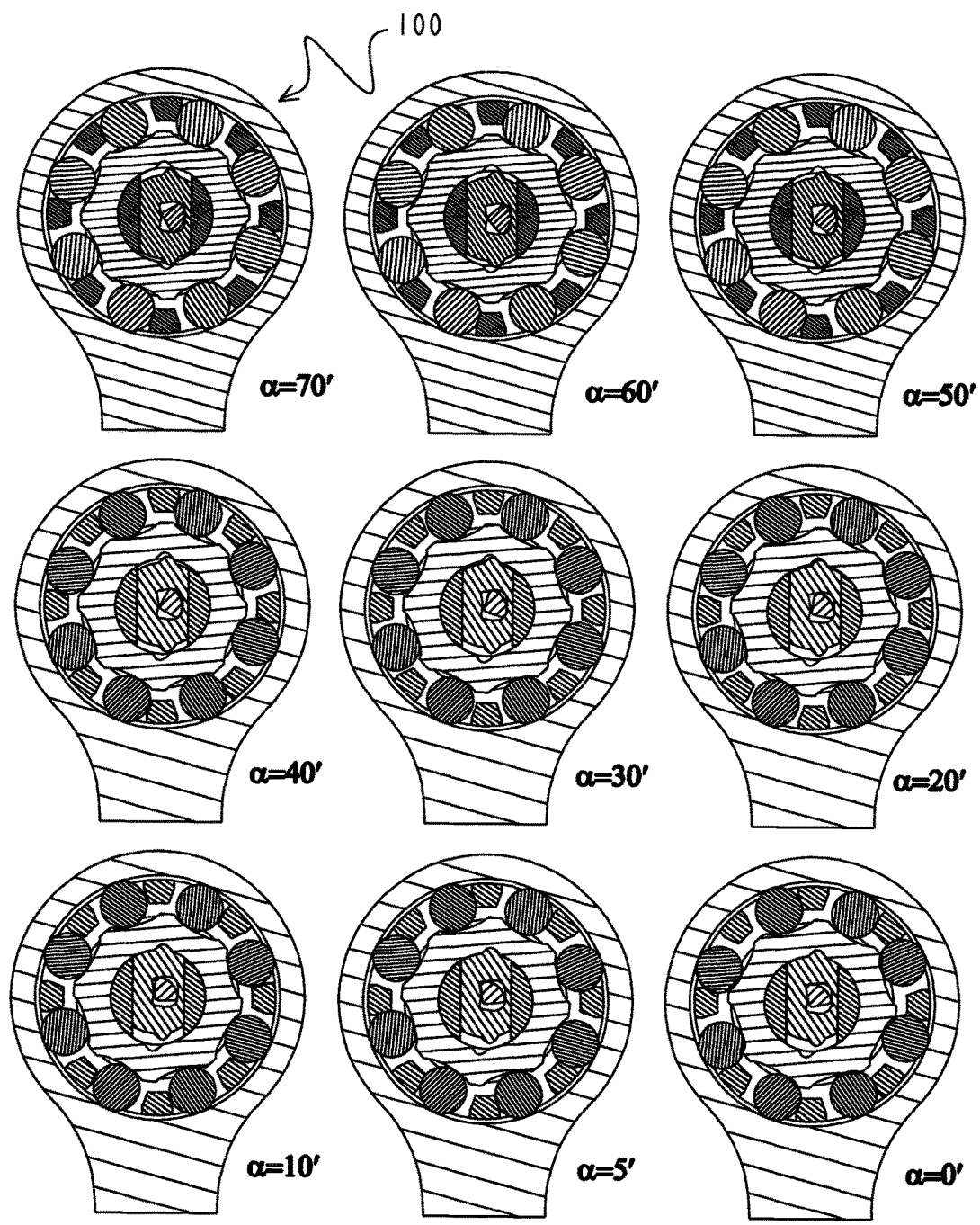

In the FIGS. 7a-c series, thumb lever 110 is rotated relative to cage 120. The position of cage 120 and handle 160 is held fixed. Spindle 140 is free to move as necessary. Cage 120 and handle 160 are held fixed in the figures for the purpose of clearly illustrating the operation of device 100. When operating device 100 with moments 101 and 102, however, cage 120 and handle 160 need not have fixed positions. They also may move in response to applied moments 101 and 102. The handle 160 may also have gravitational forces or other external forces applied.

In FIG. 7a, alpha=0, thumb lever 110 is shown at its initial position. Thumb lever 110 has been rotated counter-clockwise relative to the plane of the printed page to its fullest extent possible and detent hammer 190 is fully seated in detent pocket 121. Sliding detent tooth 135 is fully seated in detent groove 141 (device 100 could be assembled so that tooth 135 is seated in groove 142 and due to symmetry the figure would look identical, but assume it is groove 141 for the this description). With detent 135 fully seated, device 100 operates as a roller clutch (cite patent here?) that transmits torque to spindle 140 when handle part 160 rotates in the counter-clockwise direction relative to the printed page. High amounts of torque can be transferred through the wedging rollers 150, up to the shear strength of spindle tang 141. When handle 160 rotates clockwise relative to the printed page, rollers 150 in device 100 do not wedge. Device 100 now functions much like a roller bearing, transmitting a small amount of torque to spindle 140. The small amount of torque transmitted is due to a combination of the lubricant viscosity and the friction that occurs between the freely sliding rollers 150 and handle surface 162. Additional friction emanates from the surfaces of assembled parts 120, 160, 140 and 170 as these parts rotate relative to one another.

In FIGS. 7a and 7b, device 100 is shown with alpha (thumb lever 110 rotation angle is measured from cup pocket 121, FIG. 3) progressing in increments from alpha=0 degrees through alpha=110 degrees. At alpha=5 and alpha=10 degrees, the thumb lever 110 moves through the seat angle 133 but does not perform any work to retract detent tooth 135 from detent groove 141. Through the first ten degrees of rotation thumb lever 110 is moving out of the seat angle whose geometry provides advantageous reactionary forces 225.

Sometime shortly after alpha exceeds 10 degrees, thumb lever triangular boss radius 116 (FIG. 5) comes into contact with sliding detent hole inner surface 137 and begins performing work, retracting detent tooth 135. FIG. 7a, alpha=20 degrees through alpha=50 degrees, shows detent 135 retracting from detent groove 141. As detent tooth 135 retracts, applied moments 101 and 102 cause spindle 140 to rotate relative to both cage 120 and sliding detent 130 that is constrained in cage channel 121. Spindle 140 rotates counter-clockwise relative to the printed page and is only limited in its initial rotation by the reactionary forces that develop between the detent tooth 135 and detent groove 141.

FIG. 6a, alpha=60 is the approximate angle at which the rotation of thumb lever 110 retracts detent tooth 135 just clear of detent groove 141. Spindle 140 is now free to rotate unconstrained by detent tooth 135. At this point in the operation of device 100, applied moments 101 and 102 causes spindle 140 to continue counter-clockwise rotation relative to the printed page. As spindle 140 rotates, spindle ramps 143a (FIG. 4) come into contact with rollers 150. Once in contact, ramps 143a sweep the rollers 150 counter-clockwise. As rollers 150 are relocated in a counter-clockwise direction, they also may come into contact with and slide along handle surface 162. Spindle 140 and rollers 150 continue to rotate from applied moments 101 and 102 until rollers 150 approach pillar surfaces 127 (only one surface 127 is called out in FIG. 4. There are a total of eight surfaces 127 in device 100). At this point rollers 150 can begin to wedge and the rotation of spindle 140 due to applied moments 101 and 102 ends. Spindle 140 may stop rotating due to wedging of rollers 150 or do to contact of detent tooth 136 with detent groove 142 or both simultaneously. The magnitude of applied moments 101 and 102 and frictional forces determine which contact occurs first and stops the rotation of spindle 140. In FIG. 7b, approximately at or between alpha=80 and alpha=90 the rollers 150 wedge or tooth 136 contacts the surface of detent groove 142, stopping rotation of spindle 140.

At alpha=100, FIG. 7b, thumb lever 110 has pushed sliding detent 130 far enough down so that detent 136 is fully seated in detent groove 142. The geometry of detent teeth 135, 136 and detent grooves 141,142 are self-seating. The large mechanical advantage generated by thumb lever 110 drives the detents into the matching detent grooves regardless of applied moment 102, once the detent has engaged the detent groove that it mates with. When thumb lever 110 completes its 110 degree rotation (alpha=110, FIG. 7b), device 100 is now reversed. It will now transmit torque from handle 160 to spindle 140 when the handle is rotated clockwise relative to the printed page. This corresponds to loosening a standard right-hand threaded fastener.

FIGS. 7b and 7c, alpha=110 through alpha=0', illustrate reverse mechanism 100 as it operates to return to a 'forward' setting. To return to a 'forward' setting, moments 101 and 102 must be applied in the opposite direction from their representation in FIG. 1. At the end of this sequence where alpha=0', FIG. 7c, device 100 is now back to its original configuration of alpha=0, FIG. 7a. When device 100 moves from alpha=110 to alpha=0', movement of the parts is the nearly the same as that described for the movement from alpha=0 to alpha=110. The obvious differences are the reversal of the rotation direction and the different but symmetric reaction surfaces. The symmetry of operation should be obvious by inspection.

Figure 8:
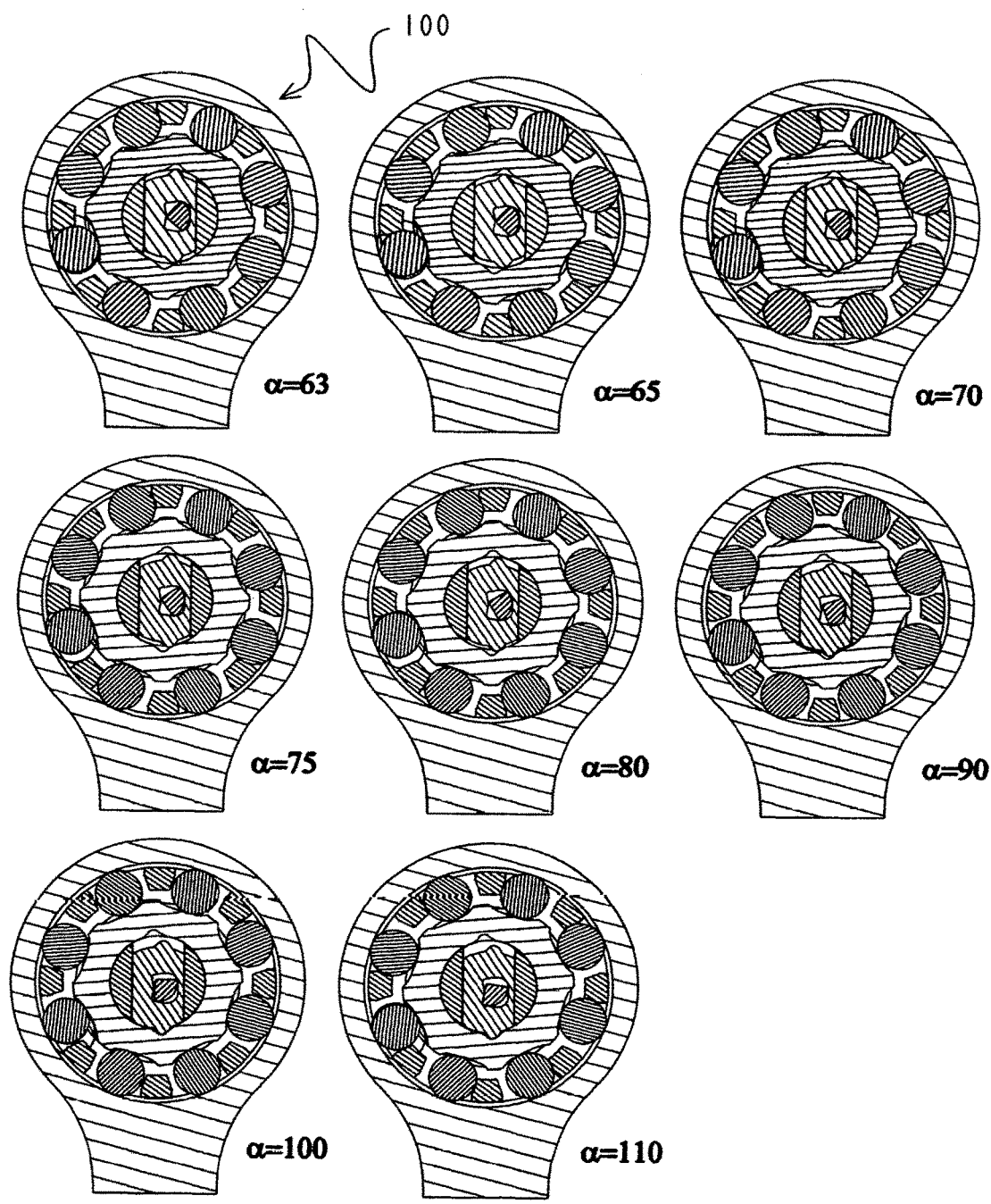
FIG. 8 presents a series of sectional views of the reverse as it moves from a forward (clockwise) to a reverse setting, in accordance with the teachings of this disclosure.

There is a second technique by which device 100 can operate to affect the directional setting of the wrench. It is possible to grasp device 200 with a single hand such that the hand holds the handle 160 and spindle tang 141 simultaneously. Depending on the operational setting, a user may wish to or simply as habit prefer to employ this method. In this case, effectively the tang 141 becomes positionally fixed to the handle 160. FIG. 8 illustrates device 100 when it operates in this scenario, placing device 100 into a counter clockwise setting. Several thumb lever angles (alpha=63, 65, 70, 75, 80, 90, 100, and 110) are illustrated in sectional views of device 100. The beginning thumb lever 110 angles have been omitted. FIG. 8 begins with the thumb lever 110 angle alpha=63. At this point in the operation of device 100, thumb lever 110 has rotated from alpha=0 to alpha=63. All parts have remained in their beginning positions except thumb lever 110 and sliding detent hammer 130 which has been retracted from detent groove 141. At approximately alpha=63, detent 136 has just come into contact with detent groove 142. Once in contact, the reactionary forces that develop between the detent 136 and detent groove 142 cause the spindle 140 to rotate. The rotation is illustrated in FIG. 8, alpha=65 through alpha=100 where the spindle rotates counter clockwise relative to the printed page. Because of the large mechanical advantage developed by thumb lever triangle 114 and sliding detent hammer shape 137, detent 136 is powerfully driven into detent groove 142 and the rotation takes place even if the operator holds the handle 160 and tang 141 simultaneously. Indeed, the human hand is not strong enough to prevent the rotation because the mechanical advantage employed by the thumb lever 110 is so large. In FIG. 8, from alpha=100 to alpha=110, the thumb lever 110 moves through the seating angle 133 and the operation of device 100 is complete.

Figure 9A:
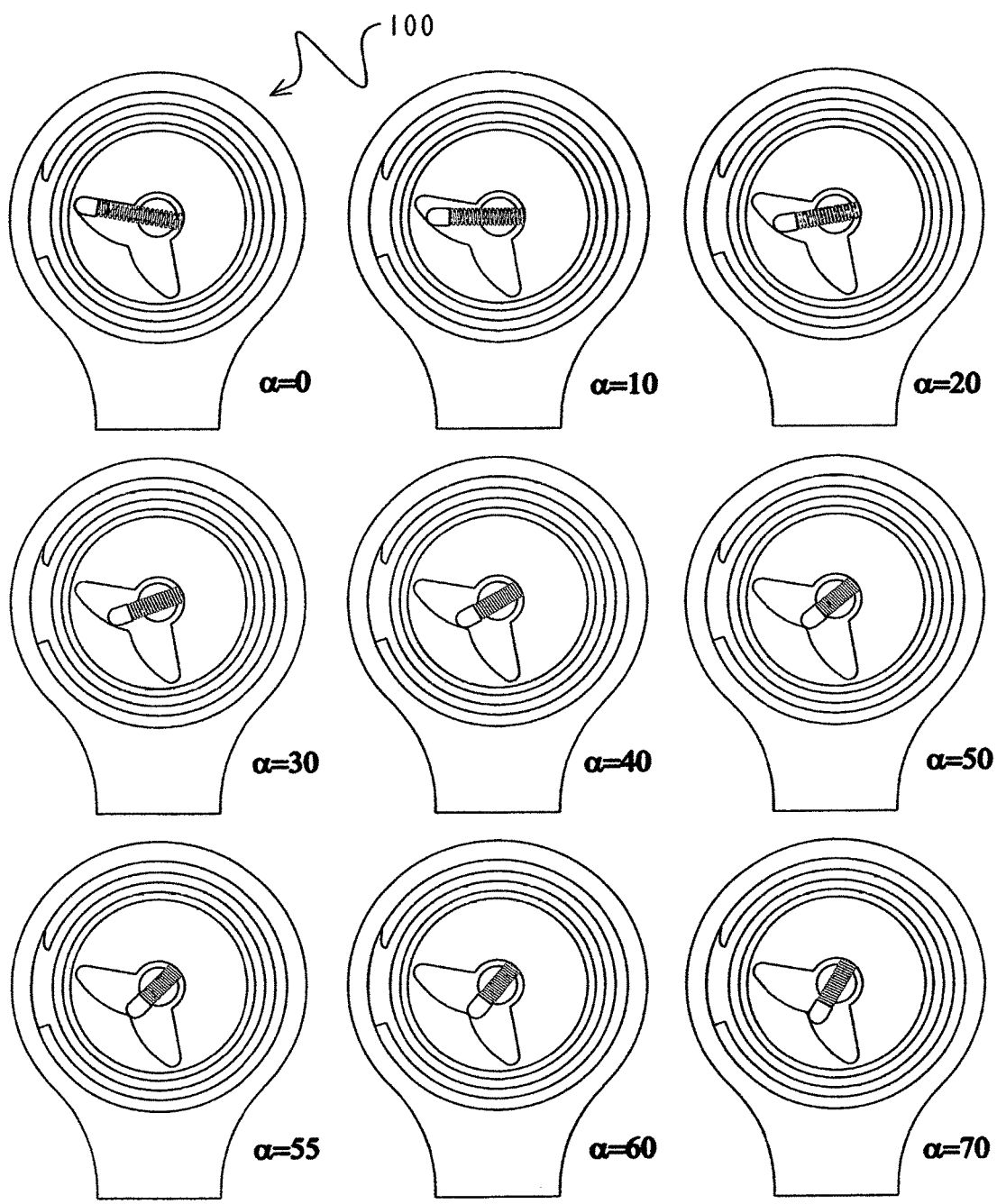
FIGS. 9a and 9b present a series of views of the reverse mechanism detent hammer as it moves from a forward (clockwise) to a reverse setting, in accordance with the teachings of this disclosure.
Figure 9B:
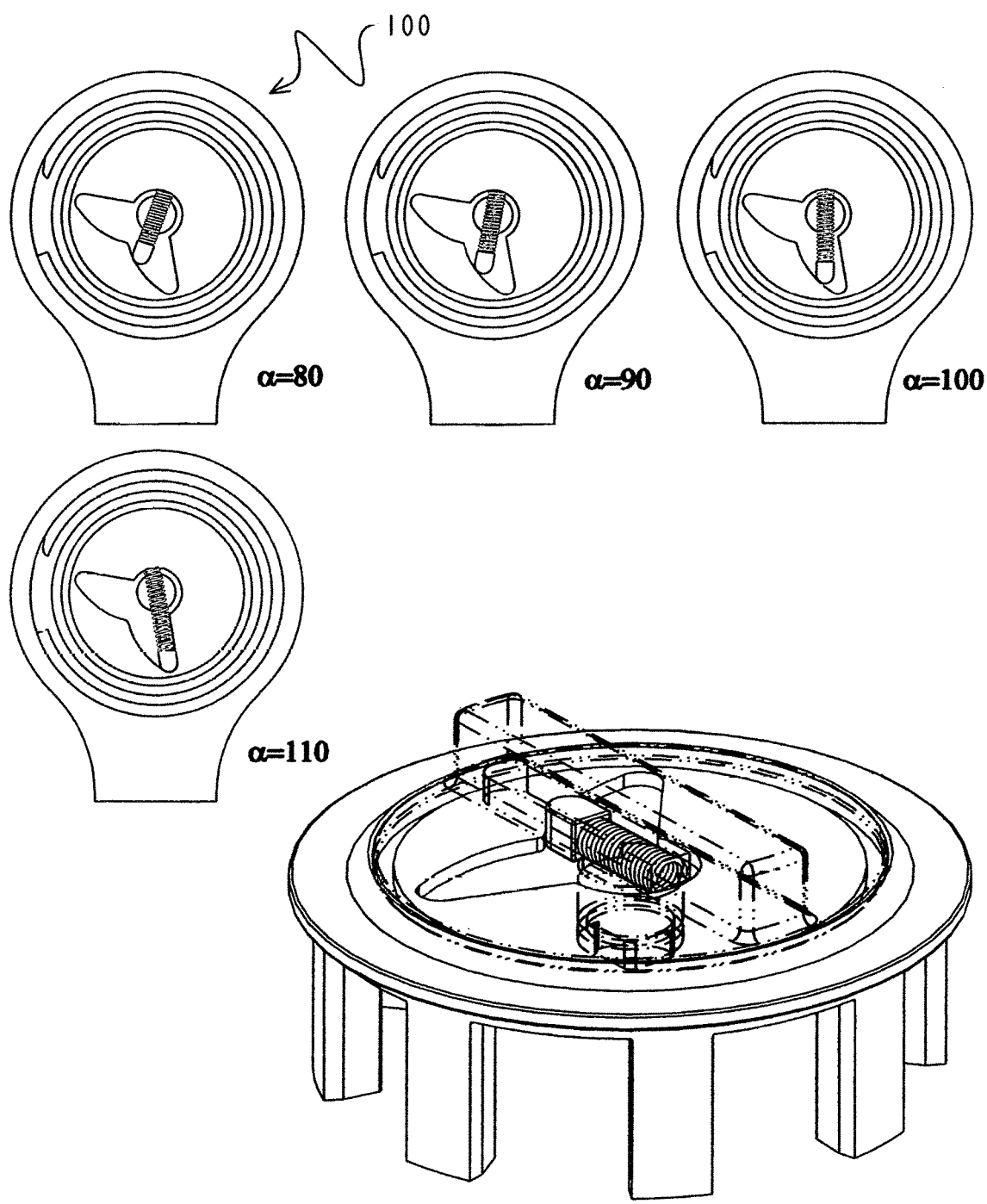

Cage 120 has two detent pockets 121 and 122 that are connected by detent curve 123 (FIG. 3). FIGS. 9a and 9b illustrate how detent hammer 190 moves along detent curve 123 as device 100 is moved back and forth between its forward and reverse settings. As thumb lever 110 is rotated from alpha=0 through alpha=55, optional detent curve 123 forces detent hammer 190 to move towards the center of thumb lever 110's axis of rotation. This movement causes spring 195 to compress and store energy. As thumb lever 110's rotation passes alpha=55 degrees, spring 195 begins to release its stored energy. The reactionary forces 505 between detent 190 and detent curve 123 cause thumb lever 110 to rotate through the remaining angles (alpha=60 through alpha=110, FIGS. 9a and 9b) under its own power.

The preferred shape of optional detent curve 123 is such that the contact angle between detent hammer 190 and detent curve 123 is always at a 45-degree angle relative to the detent hammer longitudinal axis 191 (view 500, FIG. 9b—not drawn yet) of the detent hammer 190. The equation for this line is:

$$rdr/d\theta = z, \qquad \text{Equation 3000:}$$

where r and theta are variables describing a cylindrical coordinate system and z=1. Values other than z=1 will result in reactionary forces that required the user to exert more or less torque on thumb lever 110 in order to compress spring 195.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

I claim:

1. A roller clutch mechanism comprising: A rigid spindle disposed within a housing containing a plurality of flat contact surfaces, symmetrical ramps or scallops; a cage disposed about said spindle containing a plurality of reversible wedging elements; a rigid detent slider affixed to said cage that is capable of rotating said spindle into both a forward and reverse locking position with said wedging elements; a thumb lever affixed to said detent slider converting rotational movement of the thumb lever into a reciprocating motion of the detent slider; wherein a triangular boss is attached to said thumb lever maintaining the detent slider in a locked position to counteract back pressure on said detent slider created when an off-axis force is applied to said spindle.

2. The rigid spindle of claim 1 wherein: The bottom of said rigid spindle contains one or more grooves designed to mate with a nosing of said detent slider and wherein each symmetrical scallop contains a series of ramps or radii designed to wedge one reversible wedging element between the spindle and the housing.

3. The reversible wedging elements of claim 2 wherein: The reversible wedging elements are cylindrical in shape and mated 1/1 with a rigid cage pillar.

4. The rigid detent slider of claim 2 wherein: A center of said detent slider contains an opening with a specific shape designed to accept the triangular boss attached to the thumb lever and wherein the ends of said detent slider comprise a nosing designed to rotate and mate with said spindle in both the forward and reverse position; wherein the triangular boss maintains a minimum of one point of contact with the detent slider in order to resist the back pressure generated from off-axis loading.

5. The thumb lever of claim 1 wherein: The bottom of said rigid spindle contains a variety of shapes designed to interact and engage with the thumb lever so that the spindle may be rotated into either a forward or reverse configuration.

6. The thumb lever of claim 5 wherein: The bottom of said thumb lever and the top of said rigid cage contains a spring actuated detent designed to limit the rotational arc of the thumb lever and to maneuver said spindle into a forward or reverse position; wherein the spring actuated detent provides a constant pressure on the slider, the spindle and the cage in order to create the simultaneous urging effect necessary for the correct functionality of the roller clutch.

7. The thumb lever of claim 5 wherein: The connection between said thumb lever and the top of said rigid cage may be composed of a variety of shapes provided that each shape is designed to rotate the cage or the spindle into a forward or reverse position.

8. The cage of claim 1 wherein: The cage is in the shape of either a cup or a drum and contains a series of pillars designed to simultaneously urge the reversible wedging elements into a locked and parallel position between the spindle and the housing.

* * * * *